(12) United States Patent
Pierce, Jr.

(10) Patent No.: US 7,249,439 B2
(45) Date of Patent: Jul. 31, 2007

(54) TRELLIS SYSTEM AND METHOD

(76) Inventor: Leon W. Pierce, Jr., 7382 Caran St., Stockton, CA (US) 95209

( * ) Notice: Subject to any disclaimer, the term of this patent is extended or adjusted under 35 U.S.C. 154(b) by 0 days.

(21) Appl. No.: 11/259,834

(22) Filed: Oct. 27, 2005

(65) Prior Publication Data
US 2006/0059774 A1    Mar. 23, 2006

Related U.S. Application Data (62) Division of application No. 09/999,184, filed on Nov. 29, 2001, now Pat. No. 6,973,751.

(51) Int. Cl.
*A01G 17/06* (2006.01)
(52) U.S. Cl. .................................................. 47/46
(58) Field of Classification Search ............... 47/44, 47/46–47, 70; 256/24, 31, 30; 52/736.2
See application file for complete search history.

(56) References Cited

U.S. PATENT DOCUMENTS

| | | | | |
|---|---|---|---|---|
| 2,906,380 | A * | 9/1959 | Sanders | 52/633 |
| 5,063,709 | A * | 11/1991 | Whittaker | 47/46 |
| 5,797,214 | A * | 8/1998 | Parrish et al. | 47/47 |
| 5,797,233 | A * | 8/1998 | Hascall | 52/481.1 |
| 5,964,072 | A * | 10/1999 | Rasmussen | 52/666 |
| 6,138,407 | A * | 10/2000 | Pierce, Jr. | 47/46 |
| 6,311,428 | B1 * | 11/2001 | Marino et al. | 47/46 |
| 6,948,277 | B2 * | 9/2005 | Parrish | 47/70 |

FOREIGN PATENT DOCUMENTS

JP    2001311257 A    * 11/2001

* cited by examiner

Primary Examiner—Son T. Nguyen (57) ABSTRACT

A trellis wire support apparatus and a trellis system and method for use in vineyards and the like. The trellis wire support comprises a body having at least one a fold configured to releasibly engage a corresponding slot in a support element, and at least one clip or hook configured to releasibly engage a trellis wire. The trellis systems comprise at least one support element having a slot therein, and at least one trellis wire support comprising at least one clip configured to releasibly engage a trellis wire and a fold configured to releasibly engage the slot in the support element. The trellis system may additionally comprise a cross arm, with the support element configured to couple to the cross arm. The cross arm may include parallel ridges extending along its length, and the support element may have notches adjacent each end thereof that are configured to engage the ridges on the cross arm. The trellis system may support multiple trellis wires in multiple positions depending upon the particular vigor of the plant, vine or tree by nature of soil conditions, climate, root stock, variety or other factor.

14 Claims, 5 Drawing Sheets

TRELLIS SYSTEM AND METHOD

CROSS REFERENCE TO RELATED APPLICATIONS

This Application is divisional of U.S. patent application Ser. No. 09/999,184 filed on Nov. 29, 2001 now U.S. Pat. No. 6,973,751, the disclosures of which are incorporated herein in their entirety.

FIELD OF THE INVENTION

The present invention pertains generally to support structures and devices, and more particularly to an agricultural trellis system and method for use in supporting plants, vines, trees, stalks, and the like.

BACKGROUND OF THE INVENTION

Trellis systems are commonly used in agriculture to support vines for production of wine grapes, table grapes, raisins or other vine-derived fruit. Trellis systems typically utilize a row of vertical supports or posts, with one ore more trellis wires extending along the row of posts at selected heights to provide support for vines. Cross arm structures may be used in connection with the vertical stakes to provide a variety of trellis configurations.

It is often desirable to re-position trellis wires as vines grow and develop. The trellis wires are usually held onto a stake, cross-arm or other support by bendable wire clips that are physically bent around the trellis wire and the support to hold the trellis wires thereon. In order to move or re-position the trellis wires, the wire clips must be un-bent or cut to unfasten the trellis wire from the support. The wire clips generally cannot be used again, and once the trellis wire is re-positioned with respect to the support, the trellis wire must be fastened in place with new wire clips that are again bent to hold the trellis wire in place. The re-positioning of trellis wires throughout an entire vineyard is a time consuming, labor-intensive operation.

One of the most common trellis systems used in commercial grape production is the single vertical shoot propagation or "VSP" configuration wherein all of the trellis wires are positioned within the plane defined by a row of vertical posts or stakes. The cordons of the vines are trained along the wires within the plane defined by the stakes, and the vine fruit is located generally along the plane. This arrangement is relatively easy to install and is amenable to machine harvesting techniques.

Worldwide interest in quality wines has increased greatly during recent years, and large amounts of acreage have accordingly been committed to growing wine grapes. The majority of this acreage has been set up using single VSP trellising. It has become increasingly clear in the wine and grape growing industries, however, that the single VSP trellis configuration is non-optimal for quality wine grapes. The single VSP trellis generally does not allow sunlight to reach the cordon wood, which hinders lignification of vine shoots trained along the trellis wires and reduces grape quality. The single VSP configuration also does not provide an effective shade canopy for fruit and results in sun-damage and reduced fruit quality. Further, since the vines within a single VSP trellis system are all located within a single vertical plane, the fruit suspended within the plane are held in close proximity to leaves and tend to be more susceptible to mold and moisture damage, which further reduces fruit quality.

As a result of the aforementioned drawbacks in single VSP trellis systems, new wine grape acreage, in many cases, is being developed with "dual VSP" trellising such as "V"-shaped trellises and the quadralateral Geneva double curtain or "GDC" trellis configuration. Additionally, wine grape acreage that was previously developed with single VSP trellising is being re-configured or retrofitted for dual VSP trellising. These dual VSP arrangements provide dual planes of trained cordons defining a leaf canopy that allows sunlight to penetrate into the center of the canopy to reach the cordon wood. The GDC or quadralateral system has become increasingly disfavored in that the GDC vine canopy hangs down over the fruiting zone, and while opening the interior vine main trunk to sunlight, has caused significant problems with crop mildew, uneven ripening, and requires longer hang time for ripening. This causes harvests to extend in to late fall and wet conditions and results in more difficult and expensive harvests and the need for more sulfur and anti-fungal spraying.

The installation of dual VSP trellising in vineyards is more complex and expensive than that of conventional single VSP trellising. In addition to the simple vertical posts required for single VSP trellising, at least two additional risers are required in association with each post to define dual planes for vine propagation. Additionally, one or more cross arms are typically required on the vertical stake to support the risers. The available GDC and "V"-shaped trellis systems typically require the bending of structural elements to define the dual VSP configuration, and welded components can be required. In some instances, welding operations in the field are used, resulting in further expense and difficulty.

There are numerous drawbacks associated with installation of dual VSP trellising in the above manner. The fabrication of bent and welded components adds substantial expense to vineyard establishment or retro-fitting of existing vineyards. Bent components and components that have been previously welded together are bulky and do not stack together well, and the shipping costs associated with moving large numbers of such components into the field can be substantial. The bending and welding of metal components typically results in damage to exterior finish on the components and promotes rust and reduces component lifetime. Further, the assembly of the currently available dual VSP trellis systems is complex and that lends itself to frequent errors in trellis assembly. Personnel in the field that are involved in vineyard trellis assembly are typically compensated on a piece-work basis and are unmotivated to correct errors that arise in the relatively complex assembly of available dual VSP trellis systems.

There is accordingly a need for trellising systems and methods that allow quick and easy re-positioning of trellis wires with re-usable wire clips, which facilitate the installation of dual VSP trellising and the retro-fitting of single VSP trellising to dual VSP trellising, which do not require any bending or welding operations for fabrication or installation of trellis components, and which provides quick, easy, error-free trellis assembly. The present invention satisfies these needs, as well as others, and generally overcomes the deficiencies found in the background art.

SUMMARY OF THE INVENTION

Disclosed herein are a trellis wire support apparatus and a trellis system and method for use in vineyards and other agricultural production. The trellis wire support apparatus, in its most general terms, comprises an element or body having at least one a fold, loop or other feature configured to releasably engage a corresponding slot in a support element, and at least one clip or hook configured to releasibly engage a trellis wire. In certain embodiments, the wire support apparatus comprises an elongated resilient element having first and second trellis wire clips adjacent ends thereof, and a fold or loop positioned between the clips and configured to engage a slot in a support element such as a trellis cross arm. The resilient element may be configured such that the fold or loop lies within a first plane, and such that the clip or clips lie within a second plane that is non-coplanar with respect to the first plane. The first and second planes may, in certain embodiments, be perpendicular or substantially perpendicular to each other. The fold or loop may be structured and configured to receive a releasable pin or key that holds the fold or loop within the slot in the support element. The clip may be structured and configured as a loop in which a trellis wire can snap-fit into (and out of) the loop.

The subject trellis systems comprise generally at least one support element having a slot therein, and at least one trellis wire support apparatus comprising at least one clip configured to releasably engage a trellis wire and a fold or loop configured to releasibly engage the slot in the support element. The support element may be vertically or horizontally positioned, or arranged in other orientations. In certain embodiments the trellis system comprises at least one cross arm, at least two support elements configured to couple to the cross arm and each having at least one slot therein, and at least two of the trellis wire support apparatus. More specifically, the trellis system may comprise a cross arm having first and second ridges thereon, a first support element having first and second ends each including a pair of outer notches configure to engage the first ridge on the cross arm, and an inner pair of notches configured to engage the second ridge on the cross arm, and a second support element having first and second ends each including a pair of outer notches configure to engage the first ridge on the cross arm, and an inner pair of notches configured to engage the second ridge on the cross arm.

The cross arm may include parallel ridges extending along its length, and each support element may have notches adjacent each end thereof that are configured to engage the ridges on the cross arm. In some embodiments of the trellis system, the support elements may each have a plurality of slots therein configured to accept the trellis wire support apparatus, such that the trellis wire support apparatus may be re-positioned at different locations along the support element if desired.

In certain embodiments, the support elements may comprise a first pair of first or outer notches positioned in association with a first end of the support element and configured to engage a first ridge on the cross arm, a first, pair of second or inner notches positioned in association with the first end and configured to engage a second ridge on the cross arm, a second pair of first or outer notches positioned in association with a second end of the support element and configured to engage the first ridge on the cross arm, and a second pair of second or inner notches positioned in association with the second end and configured to engage the second ridge on the cross arm. The first and second ridges on the cross arm may be located adjacent edges thereof. The ridges may be defined by a bevel portion adjacent the first edge of the cross arm, and the second ridge may be defined by an outer portion of a folded section adjacent the second edge of the cross arm. In some embodiments, the support member may comprise first and second opposing edges, with each of the first pair of first notches being positioned on an opposite one of the edges, each of the second pair of first notches being positioned on the opposite one of the edges, each of the second pair of first notches being positioned on the opposite one of the edges, and each of the second pair of second notches being positioned on the opposite one of the edges.

In certain embodiments, the cross arm may comprise first and second ridges of differing configuration, with the first and second support elements each having corresponding first and second notches at each end configured to engage the first and second ridges on the cross arm. The differently configured ridges and notches are such that a "handedness" is imparted to each end of the support elements. That is, the arrangement of the ridges on the cross arm and the notches on the support element ends can provide selectable orientations for the support elements with respect to the cross arms. The first and second notches at each end of the support elements may be in a mirror image relationship to each other, such that each support element can be either "right handed" or "left handed" with respect to the cross arm.

The subject methods comprises, in general terms, providing a support element having a slot therein and a trellis wire support apparatus having a fold or loop configured to releasably engage the slot in the support element and at least one clip configured to releasably engage a trellis wire, engaging the fold or loop of the trellis wire support apparatus in the slot of the support element, and coupling a trellis wire to the clip. The method, in certain embodiments, may comprise providing a cross arm, at least two support elements configured to couple to the cross arm and each having at least one slot therein, and at least two trellis wire support apparatus, coupling the support elements to the cross arm, engaging the fold or loop of one trellis wire support apparatus into a corresponding slot on each of the support elements, and fastening one or more trellis wires to the clips on the trellis wire support apparatus.

In certain embodiments, the methods may comprise providing a cross arm having first and second ridges thereon and at least a one support member having first and second ends each including a pair of outer notches configure to engage the first ridge on the cross arm and a pair of inner of notches configured to engage the second ridge on the cross arm, coupling the support member to the cross arm, and attaching a trellis wire to the support member. The coupling may comprise engaging a first pair of the outer notches in the support member with the first ridge on the cross arm, and engaging a first pair of the inner notches in the support member with the second ridge of the cross arm. The attaching may comprise providing a trellis wire support having at least one fold configured to releasably engage a slot in the support member and at least one clip configured to releasibly hold the trellis wire, engaging the fold of the trellis wire support in the slot in the support member, and coupling a wire to the clip.

In specific embodiments, the method may comprise coupling a cross arm to a stake, coupling first and second support elements to the cross arm, providing at least two trellis wire support apparatus, engaging a fold or loop of one trellis wire support apparatus in a slot on each of the cross arms, and coupling at least one trellis wire to a clip on each of the trellis wire support apparatus.

BRIEF DESCRIPTIONS OF THE DRAWINGS

The present invention will be more fully understood by reference to the following drawings, which are for illustrative purposes only.

DETAILED DESCRIPTION OF THE INVENTION

Before the present apparatus and methods are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It should be noted that as used herein and in the appended claims, the singular forms "a", "and", and "the" include plural referents unless the context clearly dictates otherwise. Thus, for example, reference to "a vertical support element" includes a plurality of such support elements and reference to "the wire clip" includes reference to one or more clips and equivalents thereof known to those skilled in the art, and so forth.

Any publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

Referring more specifically to the drawings, for illustrative purposes the present invention is embodied in the apparatus, methods and systems shown in FIG. 1 through FIG. 10. It will be appreciated that the apparatus may vary as to configuration and as to details of the parts, and that the method may vary as to details and the order of the acts, without departing from the basic concepts as disclosed herein. The present invention is disclosed generally in terms of agricultural use for vineyard trellis structures. The present invention may be use in a variety of structural applications.

Figure 1:
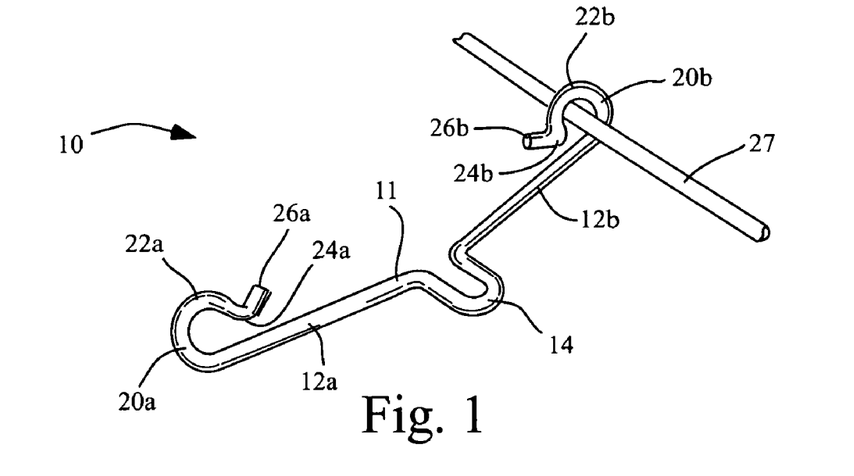
FIG. 1 is a perspective view of a trellis wire clip apparatus in accordance with the invention.
Figure 2:
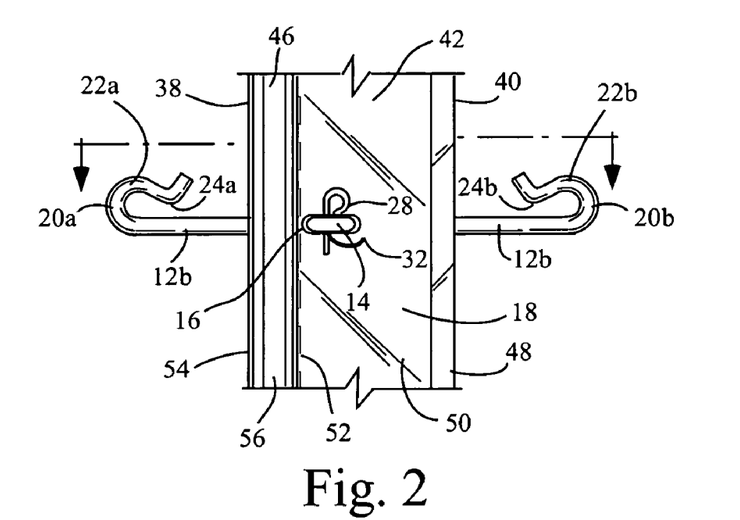
FIG. 2 is a front elevation view of the trellis wire clip apparatus of FIG. 1 shown coupled to a support element.
Figure 3:
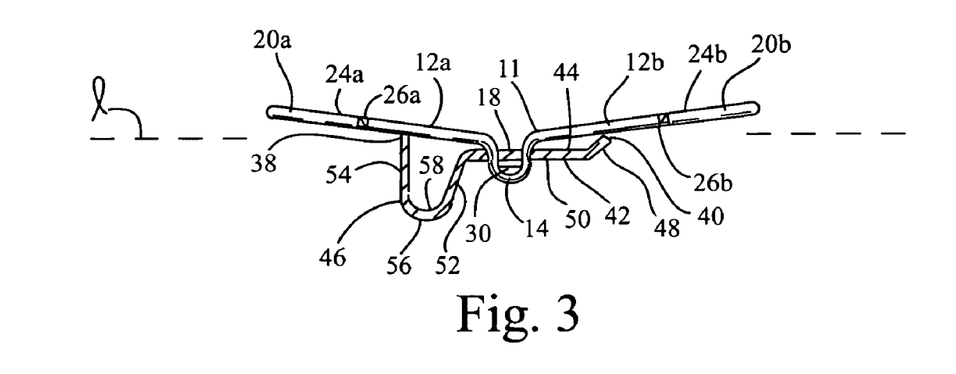
FIG. 3 is a top plan view of the trellis wire clip apparatus and support element of FIG. 2.

Referring first to FIG. 1 through FIG. 3, a trellis wire support apparatus 10 in accordance with the invention is generally shown. The apparatus 10 comprises an elongated element or body 11 that has side arms 12a and 12b and a fold or loop 14 interposed between side arms 12a, 12b. Fold 14 is configured to releasibly engage a slot 16 in a support element 18 as described further below. Wire clips 20a, 20b are included at the ends of side arms 12a, 12b respectively. Element 11 in many embodiments comprises a resilient metal wire made from steel, aluminum or other metal or metal alloy. Fold 14, arms 12a, 12b and clips 20a, 2b may comprise integral portions of a single piece of wire. In other embodiments, element 11 may comprise an engineering resin or a fiber-reinforced composite thereof.

Fold 14 may alternatively comprise any structural feature that is capable of coupling or joining to a support element 18 in a manner that allows the trellis wire support 10 to hold trellis wires in the manner described below. In this regard, fold 14 may alternatively comprise a boss, stub, clip, clamp or other feature capable of releasibly engaging a slot 16 or other feature in support element 18 for coupling thereto.

Clips 20a and 20b respectively comprise loops 22a and 22b, and catches 24a and 24b proximate to the ends 26a and 26b of element 11. Clips 22a. 22b are structured and configured to releasibly engage a trellis wire 27 by slipping the wire 27 between catch 24a and/or 24b and the corresponding side arm 12a, 12b such that the wire is retained within loop 22a, 22b. Only a single wire 27 is shown engaged in clip 22b in FIG. 1. An identical trellis wire (not shown) may be similarly engaged in clip 22a. The distance between catches 24a, 24b and their respective side arms 12a, 12b may be slightly larger than the diameter of the trellis wire 27 such that catches 24a, 24b, due to the resilient nature of element 11, will "snap-fit" the trellis wire 27 into clips 20a, 20b and hold the wire 27 therein until the wire 27 is intentionally removed. Removal of wire 27 from clip 22a or 22b merely requires application of suitable force to wire 27 to temporarily bend or snap the catch 24a, 24b outward by an amount sufficient to allow wire 27 to pass between the side arm 12a, 12b and corresponding catch 24a, 24b.

Clips 20a, 20b may be of different configuration, or may alternatively comprise any form of clip, clamp, fastener or other coupling means capable of holding a trellis wire. The use of a fold or loop shape 14 for coupling to support element 18, and the use of clips 20a, 20b as shown, allow the apparatus 10 to be easily fabricated from a single piece of wire by conventional wire bending and cutting techniques.

In the embodiment shown in FIG. 1 through FIG. 3, fold 14 and clips 20a, 20b are non-coplanar with respect to each other. As shown in FIG. 2, fold 14 extends outward from the plane of the drawing sheet on which FIG. 1 through FIG. 3 are printed, while clips 20a, 20b lie generally within the plane of the drawing sheet. In FIG. 3, fold 14 lies within the plane of the drawing sheet while clips 22 and side arms 12a and 12b are oriented substantially normal thereto. This angular relationship of fold 14 and clips 20a, 20b facilitates the fastening of trellis wires in a direction that is perpendicular, or substantially perpendicular, to the longitudinal axis of a support element 18 as described further below.

Side arms 12a and 12b may be angled or slightly angled with respect to line l and to each other, with side arms 12a, 12b being in a dihedral relationship as shown in FIG. 3. Thus, clips 20a, 20b may be substantially, but not exactly or entirely, coplanar with respect to each other, due to the slight dihedral angle. As shown in FIG. 3, side arms 12a, 12b angled at approximately three degrees with respect to line l in other embodiments, side arms 12a, 12b may be co-linear with line l and each other such that clips 20a, 20b lie exactly within the same plane. Various angular and spatial relationships for clips 20a, 20b and fold 14 may be used with the trellis wire apparatus 10, and the particular arrangement shown in FIG. 1 through FIG. 3 is merely exemplary. In other embodiments, side arms 12a, 12b may have a larger dihedral, such that clips 20a, 20b are not co-planar. The angular relationship between side arms 12a, 12b and line l may, for example, range from between about zero degrees and about five degrees in some embodiments, between zero degrees and twenty degrees in other embodiments, and between about zero degrees and sixty degrees or more in certain embodiments. The angular relationship of side arms 12a, 12b with respect to line l may in some embodiments be "less than zero" degrees such that side arms 12a, 12b are positioned on the opposite side of line l with respect to the positions shown in FIG. 3. The positional and spatial relationship of clips 20a, 20b and fold 14 on the apparatus 10 may be varied as required for use with different types of supports, risers, cross arms or other structural elements used with trellises. In embodiments wherein the apparatus 10 is made of a resilient wire, clips 20a, 20b and/or fold 14 may be bent by a user into desired configurations before or during use for trellis wire support.

In some embodiments, side arms 12a, 12b may be of unequal lengths to accommodate different trellis configurations as discussed below. Clips 20a, 20b may be of different sizes with respect to each other in order to accommodate different sizes of trellis wire 27. Various other embodiments of the apparatus 10 will suggest themselves to those skilled in the art upon review of this disclosure, and are also considered to be within the scope of the present invention.

In FIG. 2 and FIG. 3, the trellis wire clip apparatus 10 is shown coupled to a support element 18. Fold 14 is engaged in slot, notch or other opening 16 in support element 18, with fold 14 being substantially perpendicular to the plane (not shown) defined by support element 18, and with clips 20a and 20b being substantially co-planar with the plane defined by support element 18 and substantially perpendicular to fold 14. A pin or key 28 (FIG. 2) is positioned into opening 30 (FIG. 3) formed defined between fold 14 and support element 18 when fold 14 is inserted into slot 16. Pin 28 fastens trellis wire apparatus 10 to support element 18. Pin 28 may be configured to allow an installer to bend end 32 of pin 28 as shown in FIG. 2 to retain fold 14 in slot 16, and thus hold trellis wire support apparatus 10 onto support element 18. In operation, as described further below, a user may fasten a wire support apparatus 10 to support element 18 by inserting fold 14 into slot 16, and then passing clip 28 (FIG. 2) into the opening 30 (FIG. 3) define between fold 14 and support element 18, to fasten wire support 10 to the support element 18. This engagement is releasable, and the user may later remove pin 28 and withdraw fold 14 from slot 16 to remove wire support 10 from support element 18.

Figure 4:
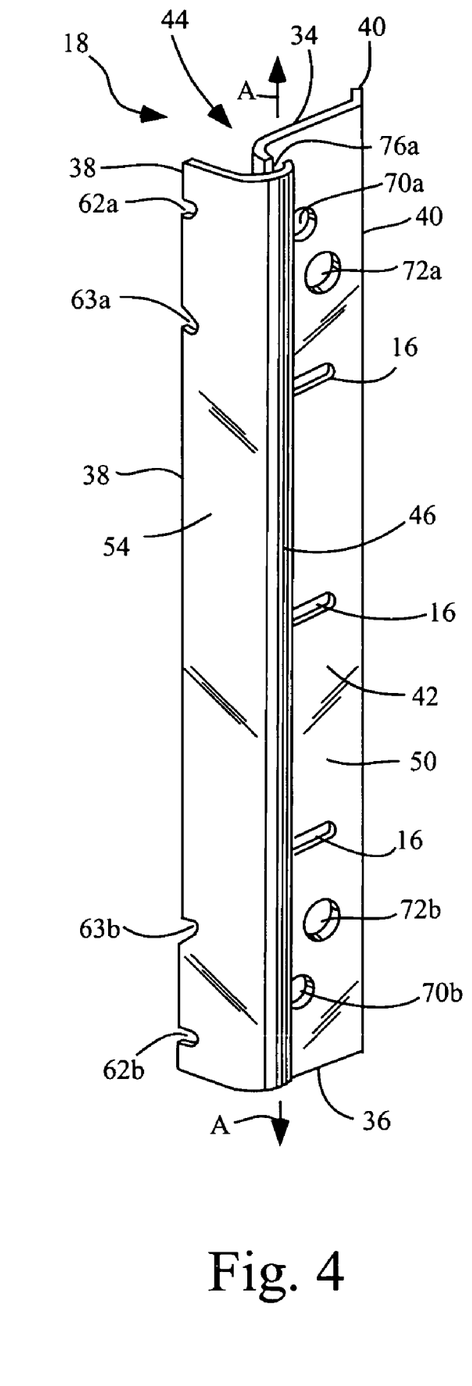
FIG. 4 is a bottom front perspective view of a support element usable with the trellis system of the invention.
Figure 5:
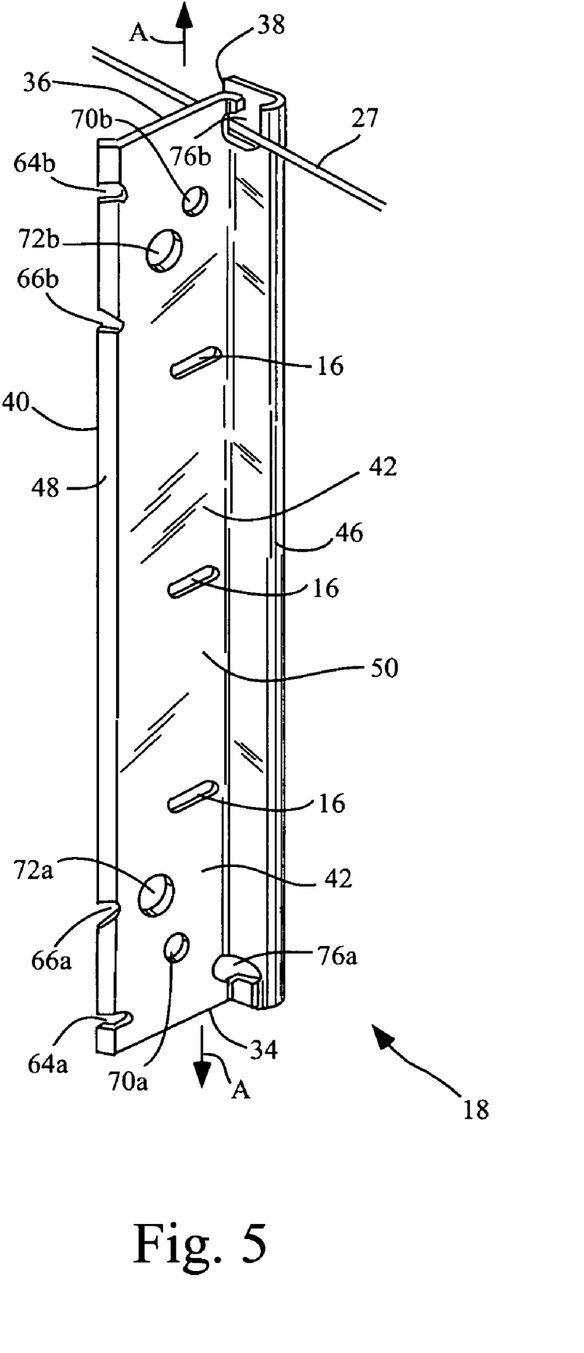
FIG. 5 is a top front perspective view of the support element of FIG. 4.

Referring also to FIG. 4 and FIG. 5, a trellis riser or support element 18 in accordance with the invention is shown. Support element 18 may be of elongated, generally rectangular shape, and includes first and second ends 34, 36, first and second edges 38, 40 which extend longitudinally between first and second ends 34, 36. Support element 18 includes first and second sides 42, 44, and a fold or folded section 46 adjacent first edge 38 which extend longitudinally between first and second ends 34, 36. A bent, beveled or angled section 48 extends longitudinally between first an second ends 34, 36 adjacent the second edge 40 of support element 18. A generally planar section 50 is located between folded section 46 and angled section 48, and extends longitudinally between first and second ends 34, 36. Slots 16 extend through planar section 50. When fold 14 of the trellis wire support 10 is engaged in a slot 16 in support element 18, side arms 12a, 12b of trellis wire apparatus 10 abut first and second edges 38, 40, as seen most clearly in FIG. 3, with clips 20a, 20b extending outward from edges 38, 40 to accommodate trellis wires 27.

Folded section 46 as shown is substantially "U"-shaped in cross section and is oriented substantially perpendicularly to planar section 50 of support element 18. Referring more particularly to FIG. 3 and FIG. 4, folded section 46 includes an inner apart 52 adjacent planar section 50, an outer flange or part 54 adjacent edge 38, and a curved section or region 56 that joins parts 52, 54. Curved region 56 and parts 52, 54 define a channel 58 which faces or opens outward towards second side 44 of support element 18, and which extends between first and second ends 34, 36 of support element 18. Outer part 54 of fold 46 may be slightly larger than inner part 52 so that first edge 38 extends outward generally past the plane defined by planar section 50, and so that first and second edges 38, 40 lie generally within a plane (not shown) adjacent second side 44 of support element 18 which is substantially parallel to and spaced apart from the plane defined by planar section 50 of support element 18. Inner and outer parts 52, 54 of folded section 46 may alternatively be structured and configured such that inner and outer parts 52, 54 are not substantially parallel to each other or substantially perpendicular to planar section 50, but instead are angled or off-parallel relative to each other, or are angled off-normal relative to planar section 50.

The support element 18 as shown herein represents merely one possible support element configuration usable with the invention. The manufacture and use of vineyard cross-arms and support elements configured in the manner shown for support element 18 is also described in U.S. Pat. No. 6,138,407, the disclosure of which is incorporated herein by reference. Other configurations for support element 18 provided by U.S. Pat. Nos. D398,064 and U.S. Pat.

No. D378,536, the disclosures of which are also incorporated herein by reference. In the embodiment shown for support element 18, bevel portion 48 and the outer portion 54 of fold 46 define ridges which extend along the length of support element 18 between ends 34, 36. As described further below, the ridges defined by bevel 48 and outer portion 54 accommodate slots or notches that facilitate the assembly of trellis systems, and which provide robustness and structural integrity to the assembled trellis systems.

Referring to FIG. 6 through FIG. 9, as well as FIG. 1 through FIG. 5, support element 18 is configured such that one or more such support elements 18 may couple together or to other support members such as a cross arm 59. In the embodiment shown in FIG. 6 through FIG. 8, cross arm 59 is configured in a similar manner to support element 18, and like reference numbers are used to denote like parts on cross arm 59. Cross arm 59 thus includes a folded section 46, a planar section 50, and edges 38, 40 that extend along the length of cross arm 59 between ends 34, 36. The bevel 48 adjacent edge 40 of cross arm 59, and the outer part 54 of folded section 46 that is adjacent edge 38 of cross arm 59, define generally parallel ridges adjacent edges 38, 40 that extend along the length of cross arm 59. Cross arm 59 is shown as coupled to a "T"-stake 60 by a "U"-bolt 61, such that cross arm 59 is generally perpendicular to stake 60. Stake 60 is mounted in the ground G, with the edge 38 of cross arm 59 located on the lower side thereof (facing towards the ground G), and with edge 40 on cross arm 59 on the upper side thereof.

Support element 18 comprises notches 62a-66b on or associated with edges 38, 40, with notches 62a-66b structured and configured to engage the ridges defined by edges 38, 40 of trellis cross arm 59. Notches 62a, 63a on edge 38 of support element 18 are positioned near or proximate to first end 34, and notches 62b, 63b on first edge 38 are positioned proximate or adjacent to second end 36. Notches 64a and 66a on second edge 40 are positioned near first end 34, and notches 64b and 66b on second edge 40 are positioned near second end 36.

Notches 62a, 63a in first edge 38 near end 34 are shown as configured in a mirror image relationship, through a plane (not shown) normal to the longitudinal axis A (FIG. 4 and FIG. 5) of support element 18, with respect to notches 62b, 63b near end 36 of support element 18. Similarly, notches 64a, 66a in edge 40 near end 34, are configured to have a mirror image relationship to notches 64b, 66b at end 36. The outermost notches 62a, 62b in edge 38, and the outermost notches 64a, 64b in edge 40, are configured to engage the ridge defined by bevel portion 48 in the edge 40 of cross arm 59. The inner notches 63a, 63b in edge 38, and inner notches 66a, 66b in edge 40 are adapted to engage the ridge defined by outer part 54 of folded portion 46 of cross arm 59 adjacent the edge 38 thereof.

Figure 9:
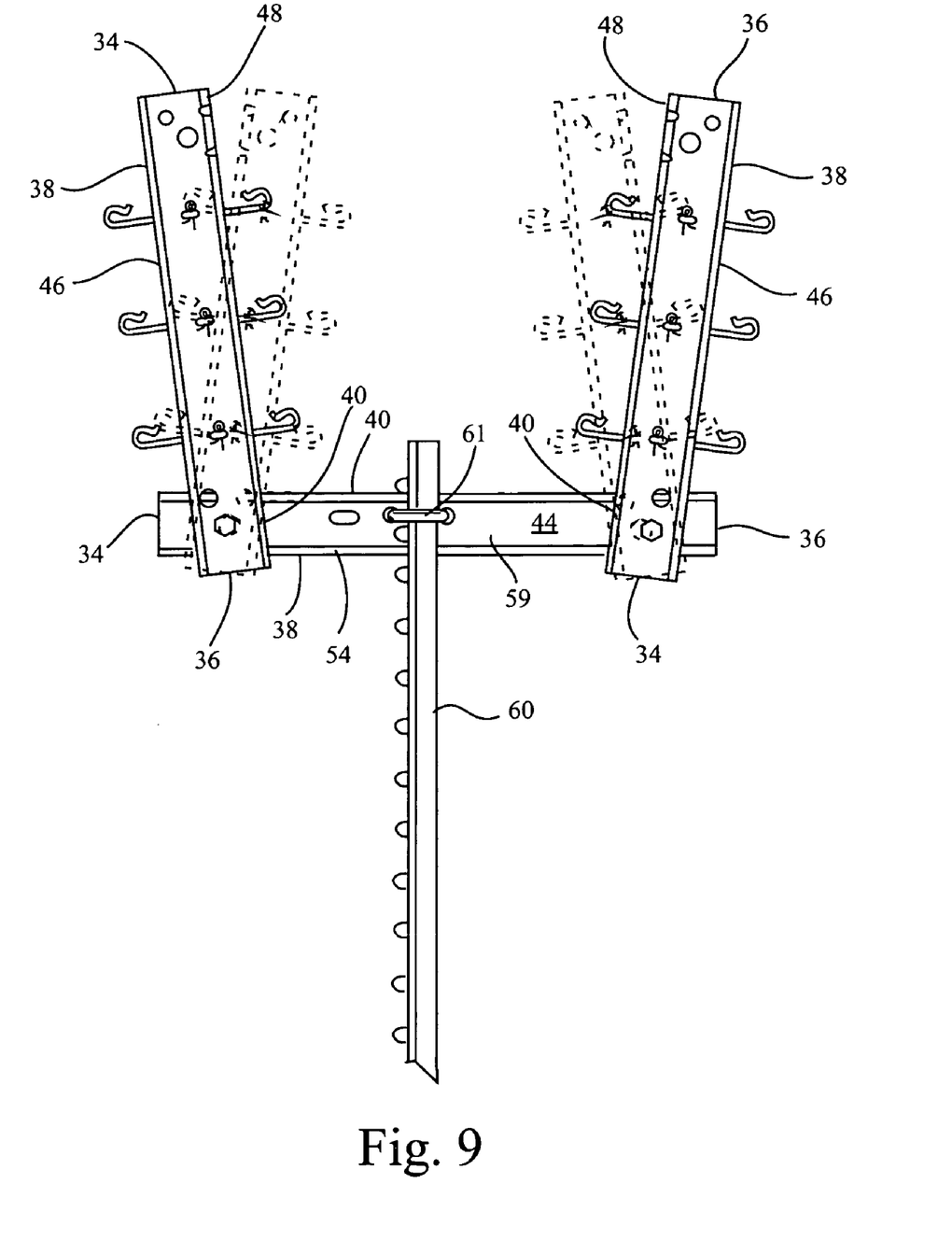
FIG. 9 is a front plan view of the trellis system of FIG. 6.

The arrangement of notches 60a-66b in the manner shown in FIG. 4-FIG. 8 and described above imparts a "handedness" to the ends 34, 36 of support element 18, which can be seen most clearly in FIG. 9. That is, the notch arrangement near end 34 of support element 18 is a mirror image of the notch arrangement near the opposite end 36. The two support elements 18 shown in FIG. 6, FIG. 7 and FIG. 9, it should be noted, are identical in configuration to each other, but are inverted or rotated in position with respect to each other such that end 36 of the left-most support element 18 is adjacent cross arm 59, while on the right-most support element 18, the end 34 is adjacent to cross arm 59.

Figure 6:
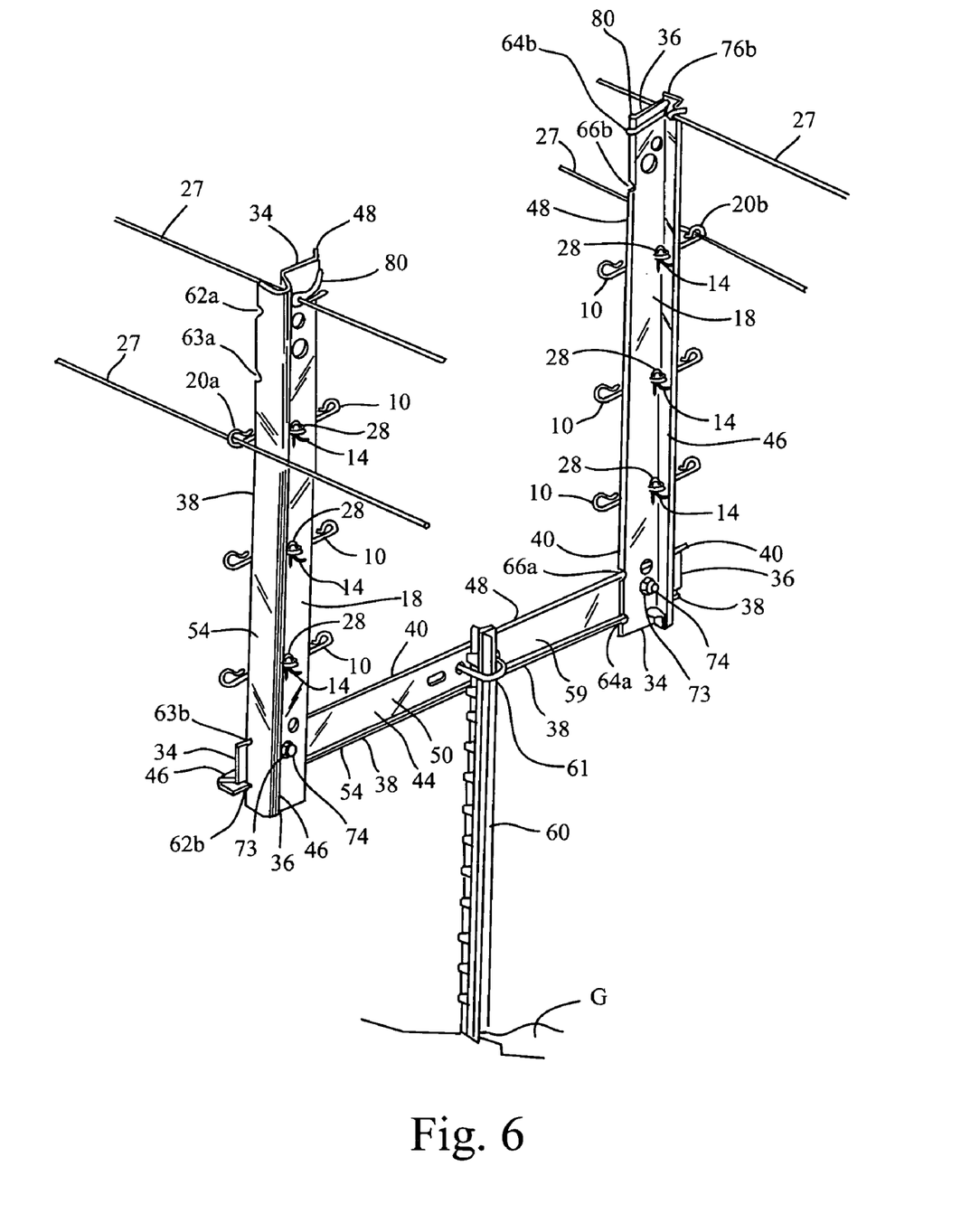
FIG. 6 is a perspective view of a trellis system in accordance with the invention.
Figures 7, 8, 10, 11:
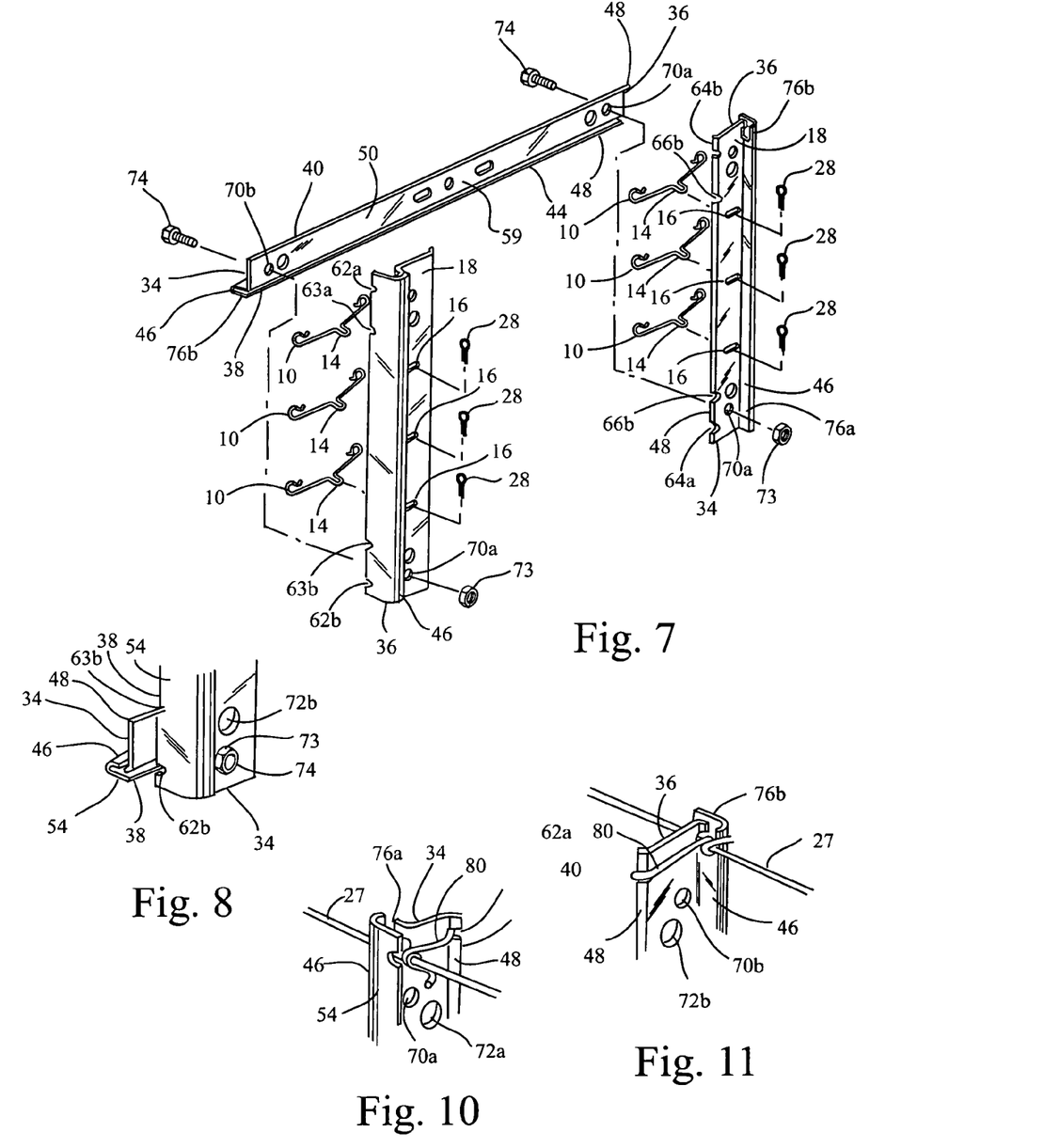
FIG. 7 is an exploded view of the trellis system of FIG. 6 shown without the "t"-stake and trellis wires.
FIG. 8 is a detailed view of the coupling of a support element to the cross arm.
FIG. 10 and FIG. 11 are detailed views of the coupling of a trellis wire to a cross arm end using a bendable wire clip.

The two support elements 18 are shown mounted onto cross arm 59 in FIG. 6, FIG. 7 and FIG. 9 with the folded section 46 at edge 38 of each support element 18 facing outward with respect to stake 60, and with beveled portions 48 at edges 40 facing inward towards stake 60. In this arrangement, the left-most support element 18 is coupled to cross arm 59 by engaging the outermost notches or slots 62b, 64a with the ridge defined by edge 38 and portion 54 of cross arm 59, and with the inner notches 63b, 66a engaging the ridge defined by bevel 48 at edge 40 of cross arm 59. A more detailed view of the coupling of notches 62b, 63b to the edges 38, 40 of cross arm 59 is shown in FIG. 8. The right-most support element 18 has outer notches 62a, 64a engaged with outer part 54 and edge 38 of cross arm 59, while inner notches 63a, 66b engage bevel 48 and edge 40 of cross arm 59.

The "handedness" imparted to support elements 18 by the arrangement of notches 60a-66b as described above results in the support elements 18 leaning outward slightly, as shown in FIG. 9, such that support elements 18 and cross arm 59 define a "lyre" configuration for trellising of grape vines or other vine-grown agricultural products. The angle of tilt or leaning of support elements 18 with respect to cross arm 59 and stake 60, it should be noted, may vary with different embodiments of the invention by varying the configuration of notches 60a-66b accordingly. In certain embodiments, support elements 18 may be positioned vertically (i.e., parallel or substantially parallel with stake 60), while in other embodiments one or both support elements 18 may be angled at, for example, between about zero degrees and about five degrees off vertical, or between about zero degrees and about twenty degrees or, in some cases, between about zero degrees and sixty degrees or more off vertical. In some instances, one or both support elements 18 may be angled inward (as shown by dashed lines in FIG. 9) rather than outward. It is contemplated that in some embodiments support members 18 may be positioned horizontally (ninety degrees off vertical) to act as horizontal extensions of cross arm 59, or may even be oriented downward towards the ground. Numerous factors may be considered in determining the angular relationship of support elements 18 with respect to cross arm 59, such as soil conditions, climate, root stock, plant varietal, or other considerations that effect plant vigor.

If the position of ends 34, 36 of support elements 18 is reversed with respect to cross arm 59, such that folded section 46 of each support element 18 faces inward towards stake 60 and beveled sections 48 faces outward (as shown by dashed lines in FIG. 9), the "handedness" of support elements 18 is reversed, and support elements 18 will lean or tilt inward towards stake 60. Each support element 18 can provide either configuration (tilted inward or outward), due to the configuration of notches 60a-66b as described above.

In many embodiments the angle of the support element 18 of the trellis system shown in FIG. 6 through FIG. 9 may be different from each other (i.e., an asymmetric lyre configuration) to account for different sun exposure, "reverse sunburn" (due to reflection or radiation of light or heat from the ground towards a vine) considerations, vineyard slope, or other factors. In certain embodiments, the two support elements 18 may be of different length to accommodate the above considerations. Numerous other variations of the trellis system will suggest themselves to those skilled in the art, and such variations are considered to be within the scope of the invention.

Support elements 18 also comprise a plurality of openings or holes 70a, 70b, 72a, 72b, which allow support element 18 to be coupled to cross arm 59 or other structural or support elements, by means of conventional fastening hardware such as nuts 73 and bolts 74, which are shown (FIG. 7) as fastening support elements 18 to cross arm 59 via holes 70a, 70b on support elements 18 and cross arm 59. Openings 70a, 72a are generally located near first end 34 on planar section 50 while openings 70b, 72b are generally located near second end 36 on planar section 50. In certain embodiments opening 70a, 72a are configured to be substantially a mirror image of the configuration of openings 70b, 72b through a plane (not shown) at the center of support element 18s that is perpendicular to the longitudinal axis A of support element 18s. FIG. 6 through FIG. 9 show the use of holes 70a, 70b for fastening of support elements 18 to cross arm 59. In other embodiments, holes 72a, 72b may alternatively be used. Holes 70a-72b may also be used to couple trellis wires to cross arm 59 and/or support elements 18.

Support elements 18 (and cross arm 59) also comprise catch holes 76a, 76b adjacent the ends 34, 36 thereof. Catch holes 76a, 76b may be used to releasibly hold a trellis wire 27 (FIG. 5) therein. The use of catch holes 76a, 76b on vineyard cross arms is also described in U.S. Pat. No. 6,138,407. Wire 27 may be further secured to support elements 18 by use of a conventional wire tie 80 (FIG. 10 and FIG. 11) which is accommodated by notch 62a or 64b and tied around wire 27 in a conventional manner. The openings 70, 72 may, if desired, also be used to accommodate one or more trellis wires 27.

The handedness of support elements 18 as described above imparts an outward tilt to the orientation of support elements 18 with respect to cross arm 59 and stake 60 as shown in FIG. 9 when support elements 18 are correctly coupled or joined to cross arm 59. Advantageously, the arrangement of notches or slots 60a-66b as described above allows each support element 18 to be used interchangeably in a right handed configuration or left handed configuration (as shown by the right-most and left most support elements of FIG. 9). Thus, when support elements 18 are shipped and used, there is no need to ensure that equal numbers of right handed and left handed support elements, or that each T-stake and cross arm are equipped with both a right handed and a left handed component.

The outermost notches 62a, 62b in edge 38 of support element 18 near end 34, and the outermost notches 64a, 64b in edge 40 adjacent end 36, are configured to engage the bevel portion 48 in the edge 40 of cross arm 59. The inner notches 63a, 63b in edge 38 near end 36 of support element 18, and inner notches 66a, 66b in edge 40 are adapted to engage the outer part 54 of folded portion 46 of cross arm 59 adjacent the edge 38 thereof, as described above. The bevel portion 48 of edge 40 and outer part 54 at edge 38 of cross arm define ridges of different configuration. Notches 62a, 62b and 64a, 64b will only accept or accommodate the ridge defined by bevel 48 of cross arm 59, and will not accept the ridge defined by outer part 54 of cross arm 59. Similarly, notches 63a, 63b and 66a, 66b are configured to accept the ridge defined by outer part 54 of cross arm and not bevel 48 of cross arm. The notch configuration of support arms 18 thus encourages users to attach support arms 18 to cross arm 59 correctly, with an outward tilt as shown in FIG. 9, and not incorrectly, with an inward tilt as shown by the dashed lines.

In the use of the invention, a plurality of "T" stakes 60 will typically be embedded in the ground G (FIG. 6) in a conventional row pattern. In many instances, "T" stakes 60 may have been previously present to support a single VSP vineyard trellis arrangement. A cross arm 59 is attached to each T-stake 60 using a conventional U-bolt 61 (the use of cross arms 61 on T-stakes 60 is described in additional detail in U.S. Pat. No. 6,138,407) or other fastening hardware, and a pair of support elements 18 are coupled to each cross arm 59 as shown in FIG. 6 through FIG. 9.

The trellis system is assembled by coupling cross arm 60 to T-stake 60 using U-bolt 61 or other suitable coupling hardware. The end 36 of a support element 18 is positioned adjacent the end 34 of a cross arm 59 (see the left-most support element in FIG. 6 and FIG. 7), with bevel 48 of cross arm engaged into notches 63b, 66b of support element 18, and with outer part 54 of cross arm 59 engaged into notches 62b, 64b of cross arm. Bolt 74 is inserted through hole 70b in support element 18 and hole 70b in cross arm, and the assembled cross arm 59, support element 18 and bolt 74 are assembled together with nut 73. In a similar manner, the end 34 of another support element 18 is positioned adjacent the end 36 of cross arm 59 (see the right-most support element in FIG. 6 and FIG. 7), with notches 63a, 66a at end 34 of support element 18 engaging bevel 48 on cross arm 59, with notches 62a, 64a engaging outer part 54 of cross arm 59, and with bolt 74 passing through openings 70a in support member 18 and cross arm 59 and engaging nut 73.

When the trellis system has been thus assembled, the cross arm 59 and support elements 18 each present several locations for the attachment of trellis wires thereto. Each support element 18 includes a plurality of slots 16 that each are configured to receive a corresponding trellis wire clip or support 10 as described above. Each support element 18 may hold multiple trellis wire supports 10 as shown in FIG. 6, and each trellis wire support 10 may releasibly hold a trellis wire 27 within each of clips 20a, 20b. Trellis wire supports 10 are held within slots 16 via pins 28 which pass through fold 14 as described above and shown in FIGS. 2 and 3. The trellis wire supports 10 may be removed, by uncoupling pins 28 from folds 14, and repositioned with respect to support elements 18 as desired. Catch holes 76a, 76b on support members 18 and cross arm 59 may additionally, or alternatively, be used to releasibly hold trellis wires 27 therein as noted above. Wires 27 may be further secured to support elements 18 by use of a conventional wire tie 80 as shown in FIG. 10 and FIG. 11. In some embodiments, a single trellis wire 27 atop each support element 18 may be used to support vines thereon. The number and location of trellis wires 27 with respect to the trellis system of the invention may vary as required depending upon the particular vigor of the plant, vine or tree grown on the trellis system, the nature of soil conditions, climate, root stock, variety, or other factors.

The trellis system of the invention is shown in FIG. 6 through FIG. 9 as having a "lyre" configuration. Various other configurations for the trellis system of the invention, such as a "V" shape and a "Geneva Double Curtain", are also possible and will suggest themselves to those skilled in the art. Support elements 18, while shown as being generally vertical in orientation, may in other embodiments of the trellis system be positioned horizontally.

When the trellis system of the invention is assembled in the above manner, the ridges defined by the bevel 48 and outer portion 54 of fold 46 on the support elements 18 and cross arm 18 are interlocked with each other by the engagement of notches 60a-66b with the corresponding ridges. This interlocking arrangement provides an easily assembled, robust, lyre-shaped dual VSP trellis system using only three structural components (i.e., a cross arm 59 and two support elements 18) with sufficient structural integrity such that additional cross arms or support elements are not required. Conventional bolts and nuts may be used for assembly of the trellis system, and no bending or welding of any parts is required. The straight, substantially flat configuration of cross arm 59 and support element 18 facilitates transportation and storage of these items prior to installation in the field.

The invention is particularly well suited for retro-fitting of previously planted single VSP trellised vineyards to a dual VSP trellis system, or replacement of existing quadralateral trellising in vineyards. The trellis system of the invention is versatile and easily adaptable to different configurations after it has been installed. The angular relationship between support elements 18 and cross arm 59 can be easily varied by changing the arrangement or positioning of notches 60a-66b on support elements. Since the coupling and uncoupling of support elements 18 to cross arm is relatively simple, the modification of an existing trellis system in a vineyard can be accomplished more easily than has been possible with previously available trellis systems. Thus, if it becomes apparent that a particular trellising arrangement in a vineyard is non-optimal due to the particular length or angular positioning of support elements 18, the support elements 18 may be easily exchanged to provide a desired change. The exchanged support elements 18 may be fitted to mature productive vines without damage to fruiting canes or loss of crop production time. The trellising configuration can also be modified by using differently configured trellis wire clip apparatus 10 in association with support elements 18 and/or cross arm 59 to change the positioning of trellis wires with respect to support elements 18. The length and angle of support elements 18, and size and configuration of trellis wire clips 10, may be accurately selected for particular conditions. This allows the vine leaf canopy to be optimally positioned over the vine fruit to prevent sun damage, and so that the fruit is suspended slightly out of the planes defined by the trellis wires and cordons and thus is less susceptible to mold and moisture damage, and provides for earlier crop harvest.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A trellis system comprising:
   (a) a cross arm having first and second ridges thereon;
   (b) a first support element having first and second ends, each said end including a pair of outer notches configure to engage said first ridge on said cross arm, each said end including a pair of inner notches configured to engage said second ridge on said cross arm; and
   (c) a second support element having first and second ends, each said end including a pair of outer notches configure to engage said first ridge on said cross arm, each said end including a pair of inner notches configured to engage said second ridge on said cross arm;
   (d) each said support element configured to support at least one trellis wire.

2. The trellis system of claim 1, wherein said cross arm includes first and second ends, said first and second ridges extending longitudinally between said first and second ends.

3. The trellis system of claim 1, wherein said first and second ridges on said cross arm are located adjacent first and second edges of said cross arm.

4. The trellis system of claim 3, wherein said first ridge is defined by a bevel portion adjacent said first edge of said cross arm, and said second ridge is defined by an outer portion of a folded section adjacent said second edge of said cross arm.

5. The trellis system of claim 1, wherein said first support element includes first and second opposing edges, each of said inner pair of notches being positioned on an opposite one of said edges, and each of said outer pair of notches being positioned on said opposite one or said edges.

6. The trellis system of claim 5, wherein said second support element includes first and second opposing edges, each of said inner pair of notches being positioned on an opposite one of said edges, and each of said outer pair of notches being positioned on said opposite one.

7. The trellis system of claim 1, further comprising at least one trellis wire support comprising a body having at least one fold configured to releasibly engage a slot in one of said support elements, and said body having at least one clip configured to releasibly hold a trellis wire.

8. A method for using the trellis system of claim 1, said method comprising:
   (a) coupling said first and second support elementsto said cross arm; and
   (b) attaching a first trellis wire to said first support element and attaching a second trellis wire to said second support element.

9. The method of claim 8, wherein said coupling comprises:
   (a) engaging a first said pair of said outer notches in said first support element with said first ridge on said cross arm;
   (b) engaging a first said pair of said inner notches in said first support element with said second ridge of said cross arm;
   (c) engaging a second said pair of said outer notches in said second support element with said first ridge on said cross arm; and
   (b) engaging a second said pair of said inner notches in said second support element with said second ridge of said cross arm.

10. The method of claim 8, wherein said attaching comprises:
    (a) providing a first trellis wire support having a fold configured to releasibly engage a slat in said first support element and a clip configured to releasibly hold said first trellis wire;
    (b) engaging said fold of said first trellis wire support in said slot in said first support element;
    (c) coupling a first trellis wire to said clip of said first trellis wire support;
    (d) providing a second trellis wire support having a fold configured to releasibly engage a slot in said second support element and a clip configured to releasibly hold said second trellis wire;
    (e) engaging said fold of said second trellis wire support in said slot in said second support member; and
    (f) coupling a second trellis wire to said clip of said second trellis wire support.

11. A trellis system comprising:
    (a) a cross arm having first and second ridges thereon;
    (b) a first riser including:
       (i) first and second ends;
       (ii) first and second ridges extending between said first and second ends;
       (iii) a first pair of outer notches adjacent said first end, one of said first pair of outer notches located in said first ridge, and the other of said first pair of outer notches located in said second ridge, said first pair of outer notches configured to engage said first ridge on said cross arm;
(iv) a first pair of inner notches adjacent said first end, one of said first pair of inner notches located in said first ridge, and the other of said first pair of inner notches located in said second ridge, said first pair of inner notches configured to engage said second ridge on said cross arm;
(iv) a second pair of outer notches adjacent said second end, one of said second pair of outer notches located in said first ridge, and the other of said second pair of outer notches located in said second ridge, configured to engage said first ridge on said cross arm; and
(v) a second pair of inner notches adjacent said second end, one of said second pair of inner notches located in said first ridge, and the other of said second pair of inner notches located in said second ridge, said second pair of inner notches configured to engage said second ridge on said cross arm; and
(c) a second riser including:
(i) first and second ends;
(ii) first and second ridges extending between said first and second ends;
(iii) a first pair of outer notches adjacent said first end, one of said first pair of outer notches located in said first ridge, and the other of said first pair of outer notches located in said second ridge, said first pair of outer notches configured to engage said first ridge on said cross arm;
(iv) a first pair of inner notches adjacent said first end, one of said first pair of inner notches located in said first ridge, and the other of said first pair of inner notches located in said second ridge, said first pair of inner notches configured to engage said second ridge on said cross arm;
(iv) a second pair of outer notches adjacent said second end, one of said second pair of outer notches located in said first ridge, and the other of said second pair of outer notches located in said second ridge, configured to engage said first ridge on said crass arm; and
(v) a second pair of inner notches adjacent said second end, one of said second pair of inner notches located in said first ridge, and the other of said second pair of inner notches located in said second ridge, said second pair of inner notches configured to engage said second ridge on said cross arm.

12. The trellis system of claim 11, wherein said first riser further comprises first and second edges, said first and second ridges located respectively adjacent said first and second edges.

13. The trellis system of claim 12, wherein said second riser further comprises first and second edges, said first and second ridges located respectively adjacent said first and second edges.

14. The trellis system of claim 11, wherein each said support element includes at least one slot configured to receive a wire support, said wire support configured to support said trellis wire.

* * * * *